US008869952B2

(12) United States Patent
Sano

(10) Patent No.: US 8,869,952 B2
(45) Date of Patent: Oct. 28, 2014

(54) ELECTROMAGNETIC BRAKE SYSTEM AND FORCE SENSE IMPARTING TYPE ROTATION INPUT APPARATUS USING THE SAME

(71) Applicant: Alps Electric Co., Ltd., Tokyo (JP)

(72) Inventor: Tadashi Sano, Tokyo (JP)

(73) Assignee: Alps Electric Co., Ltd., Tokyo (JP)

( * ) Notice: Subject to any disclaimer, the term of this patent is extended or adjusted under 35 U.S.C. 154(b) by 129 days.

(21) Appl. No.: 13/734,340

(22) Filed: Jan. 4, 2013

(65) Prior Publication Data

US 2013/0199881 A1    Aug. 8, 2013

(30) Foreign Application Priority Data

Feb. 8, 2012   (JP) ................................. 2012-024767

(51) Int. Cl.
| | |
|---|---|
| F16D 55/36 | (2006.01) |
| F16D 65/18 | (2006.01) |
| F16D 63/00 | (2006.01) |
| B60K 37/06 | (2006.01) |
| F16D 121/20 | (2012.01) |

(52) U.S. Cl.
CPC ............ *F16D 63/002* (2013.01); *F16D 65/186* (2013.01); *F16D 2121/20* (2013.01); *B60K 2350/102* (2013.01); *B60K 37/06* (2013.01)
USPC ........................................... 188/164; 188/161

(58) Field of Classification Search
CPC ... F16D 63/002; B60T 13/741; B60T 13/746; H02K 49/102; H02K 49/106
USPC ........................ 188/156–164; 310/93, 99, 103
See application file for complete search history.

(56) References Cited

U.S. PATENT DOCUMENTS

| | | | | |
|---|---|---|---|---|
| 3,329,248 | A | * | 7/1967 | Schubert ...................... 192/84.7 |
| 3,423,661 | A | * | 1/1969 | Gustafson ..................... 318/475 |
| 7,059,453 | B2 | * | 6/2006 | Yamamoto et al. .......... 188/71.5 |

FOREIGN PATENT DOCUMENTS

| | | |
|---|---|---|
| EP | 0790429 A1 | 8/1997 |
| EP | 1168622 A2 | 1/2002 |
| EP | 2161644 A2 | 3/2010 |
| EP | 2 161 644 A2 | 10/2010 |
| GB | 2186668 A | 8/1987 |

OTHER PUBLICATIONS

Extended European Search Report issued in corresponding European Patent Application No. 12193790.8, mailed May 29, 2013, 4 pages.

* cited by examiner

*Primary Examiner* — Christopher Schwartz
(74) *Attorney, Agent, or Firm* — Brinks Gilson & Lione

(57) ABSTRACT

A yoke core of an electromagnetic brake system includes a rotation shaft hole portion through which a rotation shaft is penetrated, and additionally includes an inner yoke portion and an outer yoke portion which are arranged on both inner and outer sides, by pinching a concave groove. A coil is accommodated in the concave groove and a magnetic flux is generated by applying electricity to attract an armature. The armature has a penetrating hole portion in the center, and a protruded shaft portion formed on the inner yoke portion is inserted to the penetrating hole portion. The rotation shaft has one side thereof rotatably supported by a support portion of a housing, and the other side thereof rotatably supported by the protruded shaft portion via the armature and a planetary gear mechanism. Accordingly, it is not necessary to provide bearings or the like.

6 Claims, 8 Drawing Sheets

ELECTROMAGNETIC BRAKE SYSTEM AND FORCE SENSE IMPARTING TYPE ROTATION INPUT APPARATUS USING THE SAME

CLAIM OF PRIORITY

This application claims benefit of Japanese Patent Application No. 2012-024767 filed on Feb. 8, 2012, which is hereby incorporated by reference in its entirety.

BACKGROUND

1. Field of the Disclosure

The present disclosure relates to an electromagnetic brake system and a force sense imparting type rotation input apparatus using the same.

2. Description of the Related Art

In the related art, an electromagnetic brake system used in a force sense imparting type rotation input apparatus includes a case type core (yoke) which accommodates a hoop shaped winding, a friction plate (armature: rotating plate) which rotates integrally with a rotated body to be connected to a rotation shaft supported on the case type core, and bearings which support the rotation shaft on the case type core, and therewith attracts the friction plate using an electromagnetic force generated in the case type core through applying electricity to the winding, and restrains rotations of a rotated body (for example, refer to Japanese Unexamined Patent Application Publication No. 2010-62075).

In the force sense imparting type rotation input apparatus using the electromagnetic brake system, in such a manner that depending on a rotation angle of the rotated body such as an operation knob, the electromagnetic brake system controls electromagnetic force generated, if the operation knob is operated up to a certain degree of the rotation angle, at that time, the electromagnetic brake system is immediately driven, and the rotation of the operation knob is restrained to be locked. Accordingly, by imparting a sense of resistance (sense of hitting against a wall) toward the rotation direction with respect to an operator, the fact that no more rotation is possible can be instinctively felt by the operator.

However, in the related art, the electromagnetic brake system has a configuration where the bearings are generally arranged between the case type core and the rotation shaft in order to pivotally support the rotation shaft on the case type core. Therefore, inside the case type core, it is necessary to form a hole portion for inserting the rotation shaft and additionally to arrange the bearings as a separate member. Consequently, there is a problem in that the entire system is increased in the radial direction to that extent.

SUMMARY

An electromagnetic brake system according includes a rotation shaft; a rotated body which is attached directly to the rotation shaft or via the other member, and is rotated concentrically with the axis of the rotation shaft; a ring shaped yoke having a first hole portion through which the rotation shaft is penetrated; a concave groove, an inner cylinder portion and an outer cylinder portion which are formed on the yoke, the concave groove being concentric with the first hole portion and having a ring shape, the inner cylinder portion being formed inward in the radial direction of the concave groove, and the outer cylinder portion being formed outward in the radial direction; a coil portion accommodated in the concave groove; a friction plate which has a second hole portion in the center thereof, through which the rotation shaft is penetrated, and which is connected to the rotated body in a state of being arranged between the rotated body and the yoke; and a fixing member which fixes the yoke. The inner cylinder portion has a protruded shaft portion, which protrudes toward the friction plate and is rotatably inserted to the second hole portion. The protruded shaft portion has an outer wall surface which is concentric with the first hole portion. The fixing member has a support portion, which rotatably supports the rotation shaft, the support portion has an inner wall surface which is concentric with the first hole portion in a state of being fixed to the yoke.

According to a configuration of the electromagnetic brake system of the present invention, the rotation shaft is rotatably supported concentrically with the first hole of the yoke. On the other hand, one side of the rotation shaft is rotatably supported by the inner wall surface which is concentric with the first hole portion, in the support portion, and thereby is rotated, being supported concentrically with the first hole portion. On the other hand, the other side of the rotation body is integrally rotated, being connected to the friction plate which has, in the center thereof, the second hole portion where the rotated body which is concentric with the rotation shaft is inserted to the protruded shaft portion having the outer wall surface which is concentric with the first hole portion, and thereby is rotated, being supported concentrically with the first hole portion. As a result, it is possible to smoothly and rotatably support the rotation shaft without providing a separate member such as bearings, inside the yoke. Therefore, it is possible to radially miniaturize the entire system. In addition, since a manufacturing process such as mounting the bearings can be omitted, a reduced manufacturing cost can be realized.

DESCRIPTION OF THE EXEMPLARY EMBODIMENTS

Hereinafter, embodiments of the present invention will be described with reference to the accompanying drawings.

Figure 1:
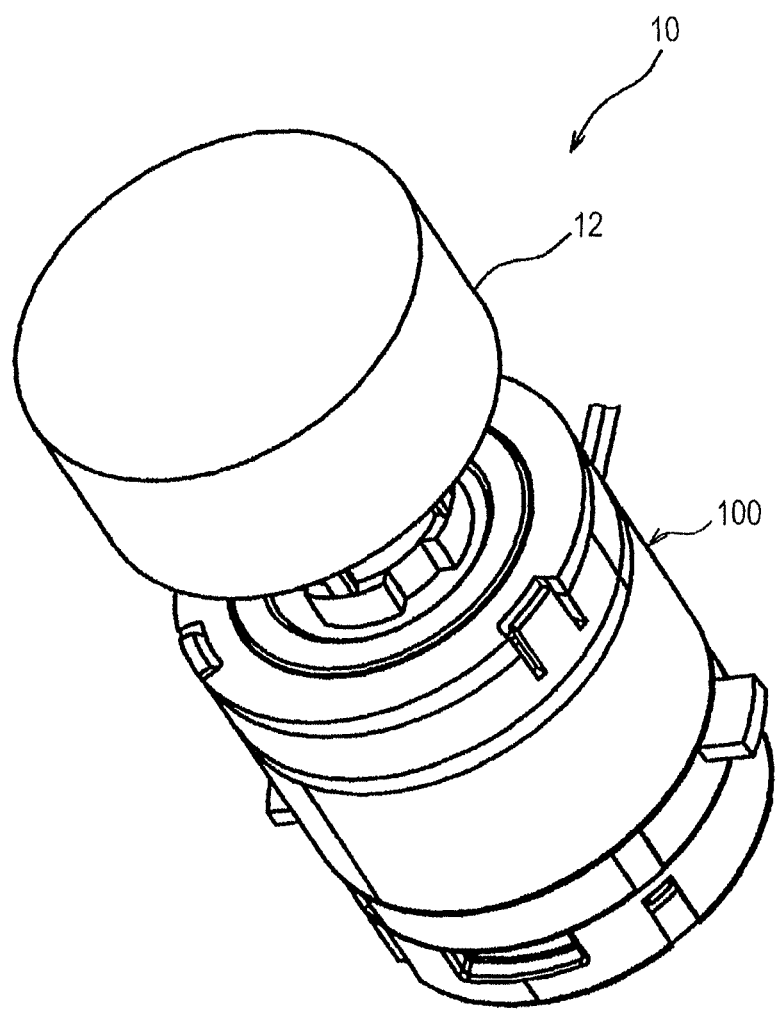
FIG. 1 is an overall perspective view of a force sense imparting type rotation input apparatus using an electromagnetic brake system of an embodiment.

FIG. 1 is a perspective view illustrating an overall configuration of a force sense imparting type rotation input apparatus (hereinafter simply referred to as a rotation input apparatus) 10 using an electromagnetic brake system 100 of an embodiment. The electromagnetic brake system 100 is suitable for a use in imparting a force sense (operation sense) in the rotation input apparatus 10. In addition, the force sense imparting type rotation input apparatus 10 is used as an input apparatus of an automotive air conditioning system, for example and installed at an instrument panel or a center console inside a vehicle.

The rotation input apparatus 10 includes an operation knob 12 as a rotation operation unit, and the operation knob 12 is connected to a rotation shaft 66 (not illustrated in FIG. 1) of the electromagnetic brake system 100. If an operator selects an operation condition for the automotive air conditioning system by rotating the operation knob 12, the force sense is imparted using the electromagnetic brake system 100.

Figure 2:
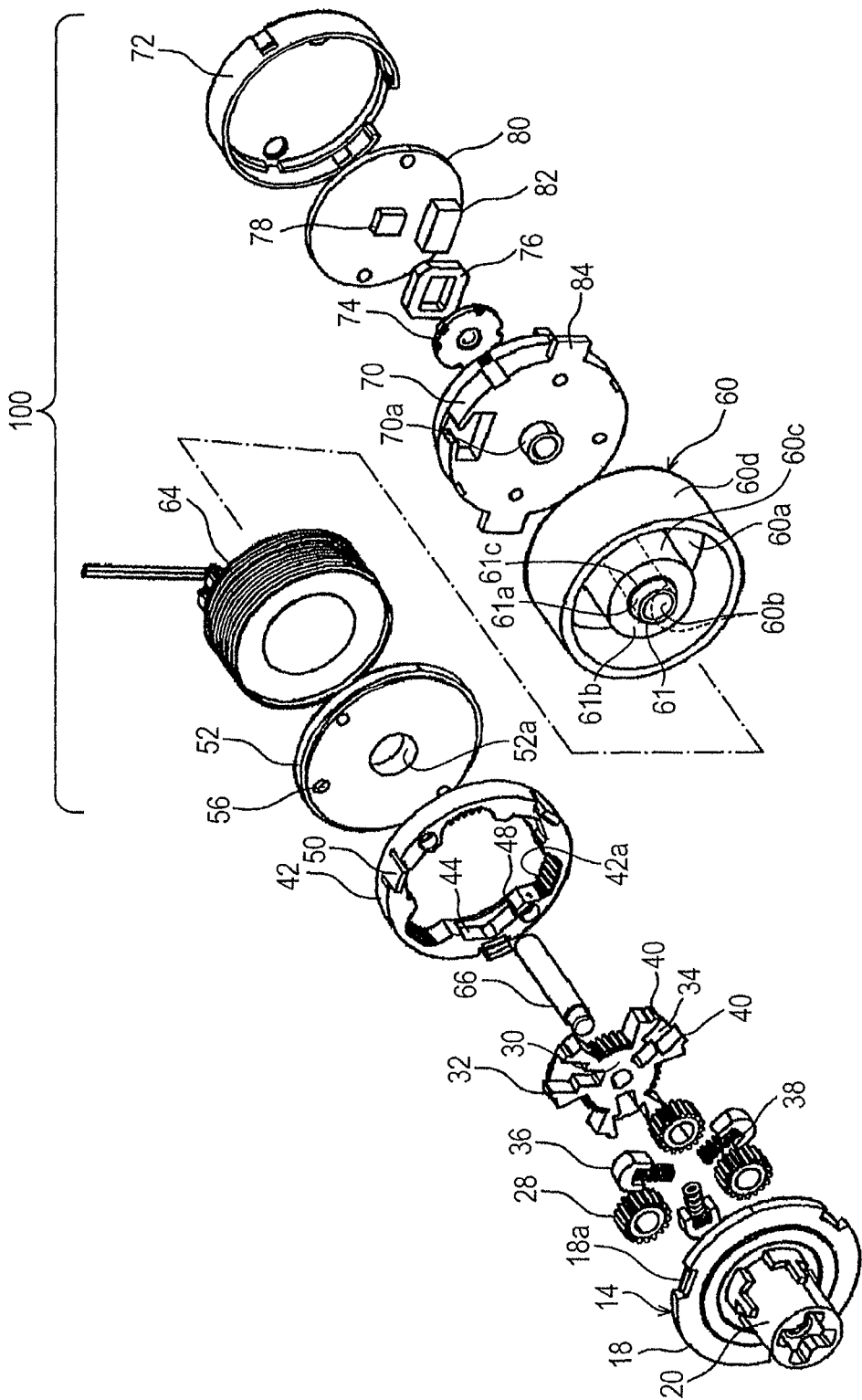
FIG. 2 is a schematically exploded perspective view of an electromagnetic brake system.
Figure 3:
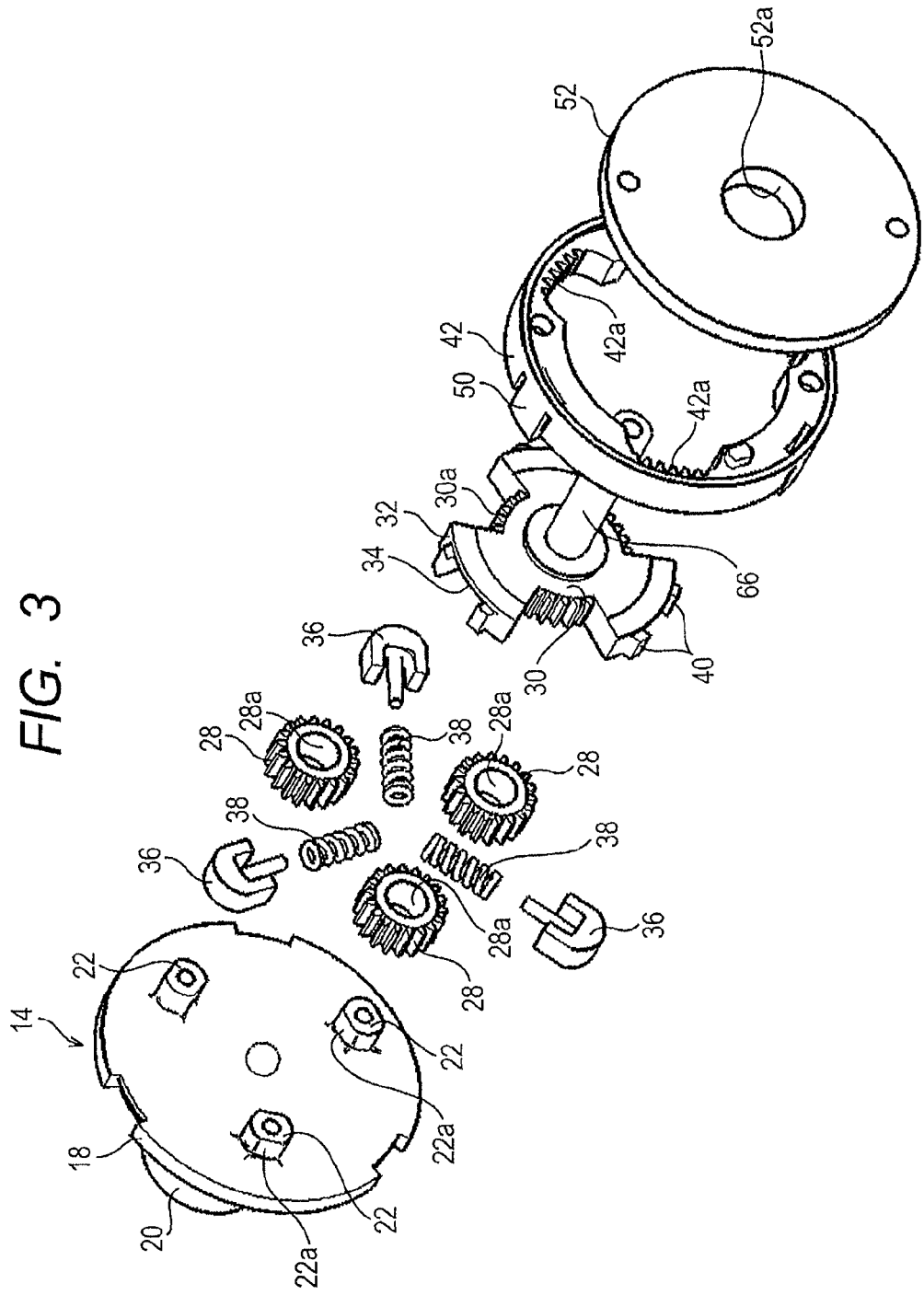
FIG. 3 is a schematically exploded perspective view of a rotation input apparatus excluding a portion of an electromagnetic brake system and an operation knob.

FIG. 2 is a schematically exploded perspective view of the rotation input apparatus 10 and the electromagnetic brake system 100 excluding the operation knob 12. FIG. 3 is a schematically exploded perspective view of the rotation input apparatus 10 excluding a portion of the electromagnetic brake system 100 and the operation knob 12. Furthermore, FIG. 3 is different from FIG. 2 in the viewing direction of the exploded perspective view. In addition, FIG. 4 is a schematic vertical sectional view of the overall rotation input apparatus 10 using the electromagnet brake system 100.

Figure 4:
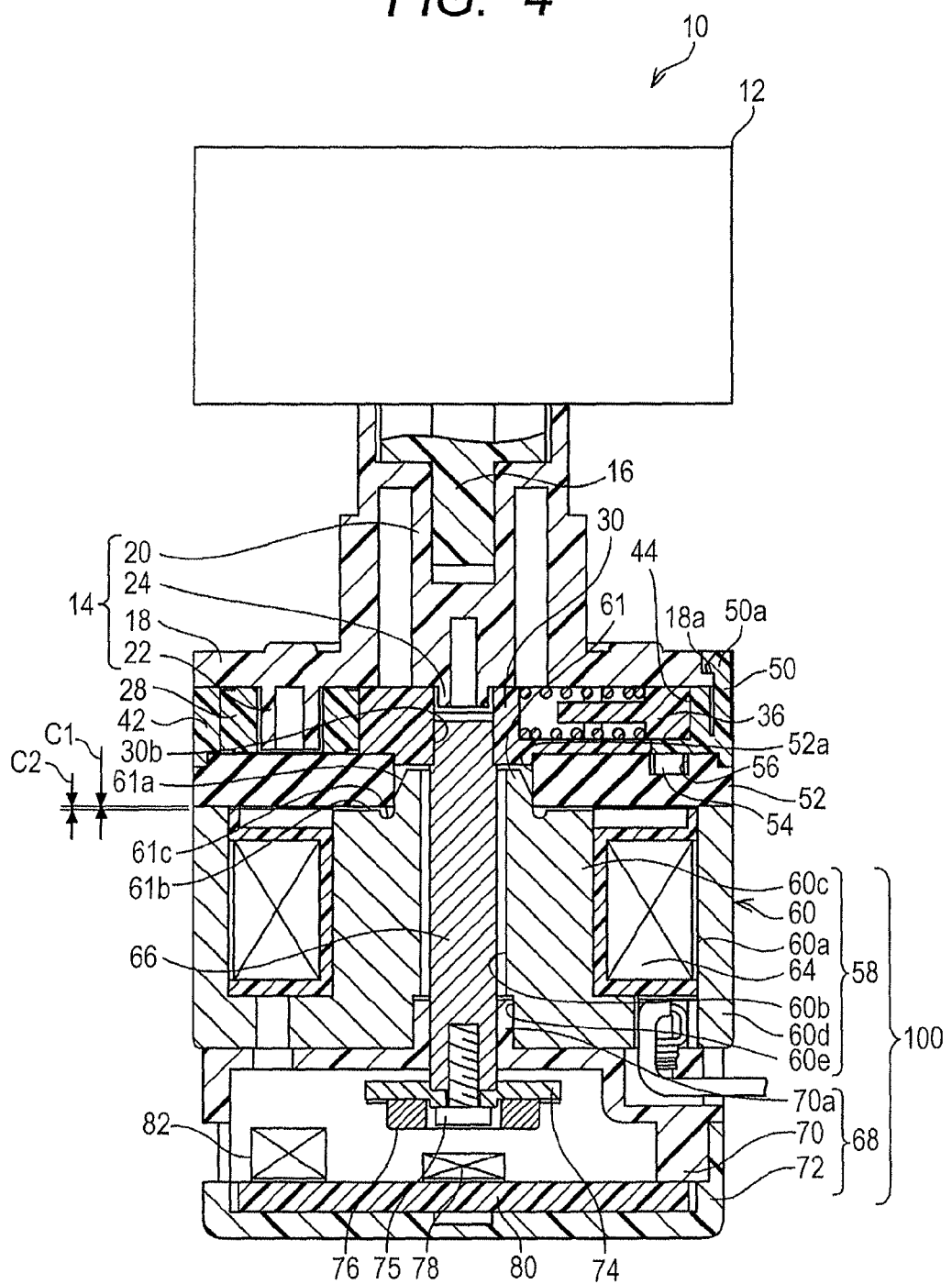
FIG. 4 is a schematic vertical cross-sectional view of an overall rotation input apparatus using an electromagnet brake system.

As illustrated in the vertical sectional view of FIG. 4, the electromagnetic brake system 100 is mainly configured of an armature 52 as the friction plate, a solenoid unit 58 and a housing 68. As will be described later, the armature 52 is rotated concentrically with the operation knob 12, being linked with the rotation of the operation knob 12. In addition, the solenoid unit 58 attracts the armature 52 formed from magnetic materials using a magnetic flux generated when applying electricity, and generates a rotation restraining force using a friction force. The rotation restraining force generated by the electromagnetic brake system 100 imparts a force sense with respect to an operator of the operation knob 12 via various configuring components (details to be described later). Furthermore, the housing 68 fixes a yoke core 60 (yoke) of the solenoid unit 58.

The electromagnetic brake system 100 includes the yoke core 60 and as illustrated in FIG. 2, the yoke core 60 is formed entirely as a ring shape. The yoke core 60 has a rotation shaft hole portion 60b in the center thereof, as a first hole portion, and a rotation shaft 66 is penetrated through the rotation shaft hole portion 60b. Furthermore, since the rotation shaft 66 is a configuring part of the rotation input apparatus 10, the details will be described later.

As illustrated in FIGS. 2 and 4, a concave groove 60a having a ring shape is formed around the rotation shaft hole portion 60b in the yoke core 60. The yoke core 60 respectively includes an inner yoke portion 60c forming an inner cylinder portion and an outer yoke portion (outer cylinder portion) 60d forming an outer cylinder portion, at both inner and outer sides in the radial direction by the concave groove 60a being pinched. Between them, the inner yoke portion 60c is formed in a relatively thick cylinder shape and the outer yoke portion 60d is formed in a relatively thin cylinder shape. The inner yoke portion 60c and the outer yoke portion 60d are in a concentric shape with each other, and the center is matched with a central axis (not illustrated) of the rotation shaft hole portion 60b.

The solenoid unit 58 has a coil (coil portion) 64 and the coil 64 is accommodated inside the concave groove 60a of the yoke core 60. Furthermore, the winding center of the coil 64 is substantially matched with the rotation center of the rotation shaft 66. The yoke core 60 is configured of a soft magnetic material.

The housing 68 is formed of an upper case 70 and a lower case 72. The upper case 70 is configured of the soft magnetic material. Furthermore, the upper case 70 is equivalent to a fixing member, which fixes the yoke core 60.

Figure 5:
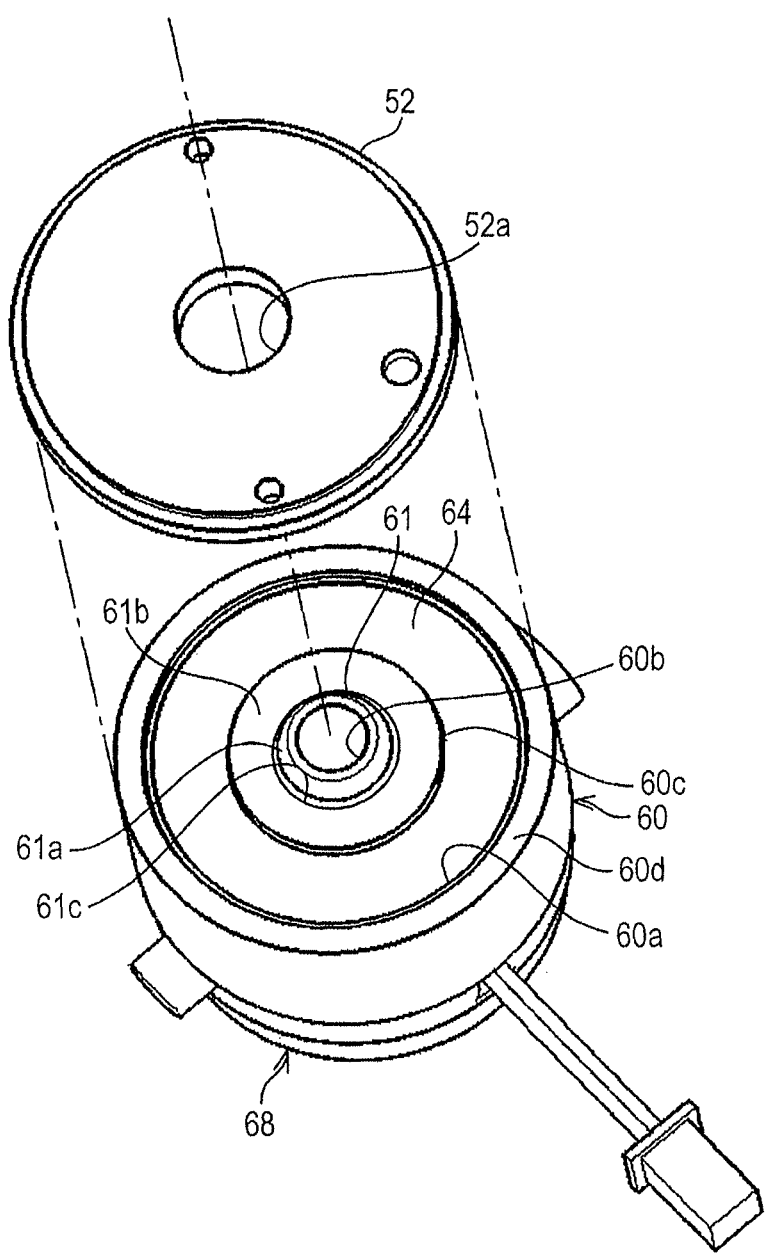
FIG. 5 is an exploded perspective view illustrating a state where an armature is separated from a yoke core.

FIG. 5 is an exploded perspective view illustrating a state where the armature 52 is separated from the yoke core 60. The armature 52 is entirely disk shaped, and in the center thereof, a penetrating hole portion 52a is formed as a second hole portion. In a state where the rotation input apparatus 10 is completely manufactured, the rotation shaft hole portion 60b (first hole portion) and the penetrating hole portion 52a (second hole portion) are concentric with each other, and the above-described rotation shaft 66 is penetrated through the penetrating hole portion 52a. The armature 52 is arranged to oppose the yoke core 60 and the lower side surface in FIG. 4 is in contact with the end surface of the outer yoke portion 60d.

A protruding shaft portion 61 is formed so as to protrude toward the armature 52, on the inner yoke portion 60c of the yoke core 60. The protruded shaft portion 61 has an outer wall surface, which is concentric with the rotation shaft hole portion 60b, and is rotatably fitted into the penetrating hole portion 52a.

As illustrated in FIG. 4, the protruded shaft portion 61 rotatably supports the armature 52 in a state of being fitted into the penetrating hole portion 52a. In this state, the armature 52 is connected to the rotation shaft 66 via the various other configuring components (details to be described later).

One side (lower side in FIG. 4) of the rotation shaft 66 is rotated by being supported concentrically with the rotation shaft hole portion 60b (first hole portion). That is, the one side of the rotation shaft 66 is rotatably supported by an inner wall surface of a support portion 70a fitted into an insertion hole portion 60e (third hole portion) which is formed concentrically with the rotation shaft hole portion 60b, and thereby is rotated by being supported concentrically with the rotation shaft hole portion 60b. Here, the support portion 70a is formed to protrude from an upper surface (contact surface with the yoke core 60) of the upper case 70 toward the protruding direction of the protruded shaft portion 61. The insertion hole portion 60e has a larger diameter than the rotation shaft hole portion 60b and a length which enables the outer peripheral portion of a support portion 70a to be inserted, and is formed at the housing 68 side so as to be consecutive with the rotation shaft hole portion 60b.

Figure 6:
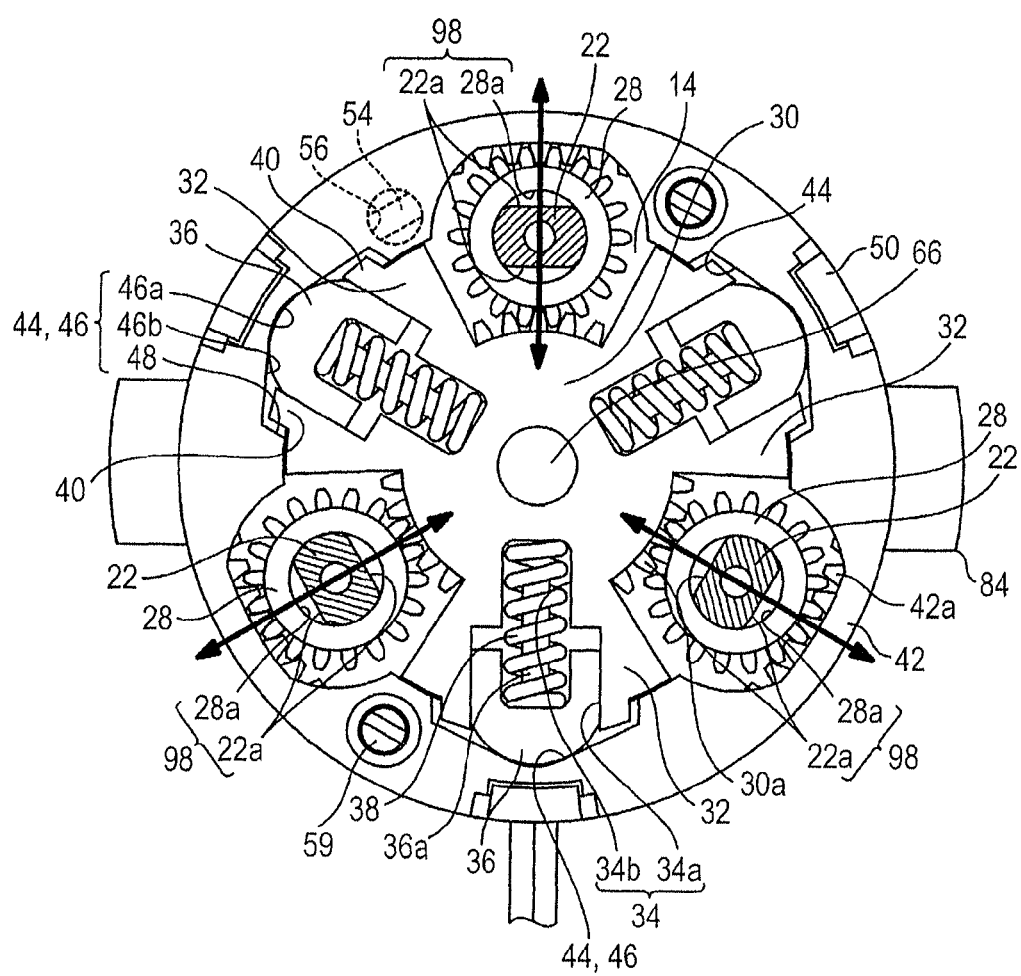
FIG. 6 is a plan view illustrating a main portion of a rotation input apparatus.

The other side (upper side in FIG. 4) of the rotation shaft 66 is also rotated by being supported concentrically with the rotation shaft hole portion 60b. That is, an outer gear 42 (rotated body, to be described later), which is rotated concentrically with the axis of the rotation shaft 66 is connected to the armature 52 (friction plate, to be described later) which is rotated concentrically with the rotation shaft hole portion 60b (first hole portion). Therefore, the other side of the rotation shaft 66 is rotated by being supported concentrically with the rotation shaft hole portion 60b. Furthermore, as illustrated in FIG. 6, the outer gear 42 is engaged with a sun gear 30, which concentrically fixes the rotation shaft 66 via a planetary gear 28 revolving concentrically with a planetary carrier 14 (to be described later), and consequently is rotated concentrically with the rotation shaft 66. As illustrated in FIG. 4, the armature 52 includes the protruded shaft portion 61 having the outer wall surface which is concentric with the rotation shaft hole portion 60b (first hole portion), which is fitted into the penetrating hole portion 52a (second hole portion) formed in the central portion thereof, and consequently is rotated by being supported concentrically with the rotation shaft hole portion 60b.

Accordingly, the rotation shaft 66 is rotatably supported concentrically with the axis of the rotation shaft hole portion 60b (first hole portion) of the yoke core 60. In this manner, the electromagnetic brake system 100 of the present embodiment does not need to provide a part such as bearings between the yoke core 60 and the rotation shaft 66, and the rotation shaft 66 can be smoothly and rotatably supported. Therefore, it is possible to radially miniaturize the entire system. In addition, since a manufacturing process such as mounting the bearings can be omitted, a reduced manufacturing cost can be realized.

In addition, as illustrated in FIG. 4, the armature 52 is arranged to oppose the yoke core 60. However, at this time, a distance C1 between the armature 52 and the end surface of the outer yoke portion 60d is set to be 0 mm and thereby both are in contact with each other.

On the other hand, a distance C2 between the armature 52 and the end surface of the inner yoke portion 60c is set to be longer than the zero dimensions (C1<C2). Therefore, the armature 52 and the end surface of the inner yoke portion 60c maintain a non-contact state.

Accordingly, if a magnetic flux is generated when applying electricity to the coil 64, the magnetic flux between the armature 52 and the yoke core 60 largely concentrates on the end surface side of the outer yoke portion 60d compared to the end surface side of the inner yoke portion 60c. Therefore, the armature 52 is strongly attracted to the end surface of the outer yoke portion 60d. Accordingly, a distance from the axis of the armature 52 to a place of generating a rotation restraining force can be set to be longer, and thereby a larger rotation restraining force (brake torque) can be obtained even in a case of the electromagnetic brake system 100 having the same size. Consequently, it is possible to miniaturize the entire system. In addition, even if the armature 52 is attracted to the end surface of the outer yoke portion 60d by a magnetic force at this time, the original distance C1 between both parties is set to have the zero dimensions and consequently collision sound of the armature 52 is not produced.

In addition, when the armature 52 is rotated, even if abrasion powder, produced in such a manner where the inner peripheral surface of the penetrating hole portion 52a and the outer peripheral surface of the protruded shaft portion 61 come into contact with each other and are rubbed against each other, is moved to a space (clearance of the larger distance C2 than the zero dimensions) between the armature 52 and the end surface of the inner yoke portion 60c, operation sense is unlikely to be hindered.

The protruded shaft portion 61 has an inclined surface 61a which has a tapered shape toward the tip. Therefore, in a state where the protruded shaft portion 61 is inserted to the penetrating hole portion 52a, a moderate air gap (vacant space) is formed in the place between the inclined surface 61a and the inner peripheral surface of the penetrating hole portion 52a, and thereby the concentration of the magnetic flux on this place is alleviated when applying electricity to the coil 64. Accordingly, it is possible to prevent the concentration of the magnetic flux between the protruded shaft portion 61 and the armature 52 when applying the electricity to the coil 64, and it is possible to concentrate the magnetic flux on the end surface side of the outer yoke portion (outer cylinder portion) 60d. Consequently, it is possible to increase a rotation restraining force with respect to the armature 52.

In addition, in the inner yoke portion 60c, a ring shaped concave portion 61c is formed on a flat area 61b from the root of the protruded shaft portion 61 through the concave groove 60a. In such a concave portion 61c, the abrasion powder generated between the outer wall surface of the protruded shaft portion 61 and the inner peripheral surface of the penetrating hole portion 52a of the armature 52 can be accumulated in the concave portion 61c. Therefore, it is possible to prevent defects (deteriorated operation sense, increased rotation resistance and the like) due to the movement of the abrasion powder to another place. Here, the concave portion 61c may be a plurality of concave portions which is scattered in the circumferential direction.

Next, the rotation input apparatus 10 using the electromagnetic brake system 100 will be described based on FIGS. 2 to 6. Furthermore, FIG. 6 is a plan view illustrating the rotation input apparatus 10 excluding the operation knob 12 and some configuring components.

As a planetary gear support, which rotatably supports planetary gears 28, the planetary carrier 14 is connected to the operation knob 12 so as to be integrally rotated concentrically with the operation knob 12.

More specifically, the operation knob 12 has a connection shaft portion 16, which is connected to the planetary carrier 14. The planetary carrier 14 includes a connection cylinder portion 20 protruding from the surface of the operation knob 12 side of a disk portion 18, gear shaft portions 22 protruding the surface of the opposite side to the operation knob 12 of the disk portion 18, and a rotation shaft portion 24.

The connection shaft portion 16 of the operation knob 12 and the connection cylinder portion 20 of the planetary carrier 14 are combined by self-tapping screws or the like.

The gear shaft portions 22 are arranged in a concentric circle at 120° intervals around the rotation shaft portion 24. Cut surfaces 22a are formed inward and outward in the radial direction of the planetary carrier 14, on the gear shaft portions 22, and thus it is possible to expand a range which enables the planetary gear 28 to be displaced in the radial direction of the planetary carrier 14. According to this configuration, even if the rotation center of respective rotation members configuring a planetary gear mechanism is eccentric with respect to the rotation center of the operation knob 12, the rotation of the planetary gears 28 is not hindered and thereby a smooth rotation operation of the operation knob 12 can be realized.

The respective planetary gears 28 are rotatably supported on each of the gear shaft portions 22.

As illustrated in FIG. 6, three planetary gears 28 are respectively engaged with internal teeth 42a which are formed on an outer gear 42, as the rotated body, and external teeth 30a formed on the sun gear 30 which is a rotation substrate forming a first rotation body. The planetary gears 28, the sun gear 30 and the outer gear 42 configure the planetary gear mechanism.

As illustrated in FIG. 4, a rotation shaft 66 forming a portion of the first rotation body, is provided, together with the above-described rotation substrate, being fixed concentrically to lower side (in the drawing) of a shaft hole 30b in the center of the sun gear 30 (rotation substrate). The rotation shaft portion 24 of the planetary carrier 14 is rotatably inserted to the upper side (in the drawing) of the shaft hole 30b. Accordingly, the rotation shaft 66 is provided so as to be rotated indirectly and concentrically with respect to the operation knob 12, and is provided so as to be rotated indirectly and concentrically with respect to the outer gear 42 as well. In addition, the outer gear 42 has a substantially ring shape and is rotatable concentrically with respect to the rotation shaft 66.

As illustrated in FIG. 6, the sun gear 30 has protruded base portions 32 which protrude further outward in the radial direction than any of the external teeth 30a, between the three external teeth 30a. Concave portions 34 are formed on each of the protruded base portions 32 respectively. Each of the concave portions 34 is extended in the radial direction of the sun gear 30 and is open outward in the radial direction.

Plungers 36 and compression coil springs 38 are respectively arranged on each of the concave portions 34. The plungers 36 are always urged outward by the compression coil springs 38 so as to come into elastic contact with concave cam portions 44 as a cam portion (to be described later).

The plungers 36 have shaft portions 36a inserted into the compression coil springs 38.

The concave portions 34 are formed through a step such that outer concave portions 34a are wider than inner concave portions 34b in the radial direction. The plungers 36 are in sliding contact with the outer concave portions 34a so as to be capable of reciprocating. Projections 40 protruding outward in the radial direction are formed on both sides of an opening of the concave portions 34. The projections 40 are to regulate an angular range of play (to be described later).

As illustrated in FIG. 6, tip portions of the plungers 36 disposed at each of the protruded base portions 32 are in contact with the inside surface of the outer gear 42. Three concave cam portions 44 are formed as the cam portion.

Each of the concave cam portions 44 has a cam surface 46, which the tip portions of the plungers 36 elastically come in to sliding contact with. The cam surface 46 is formed of a trough portion 46a in the center and a pair of inclined surfaces 46b pinching both sides thereof. A distance from the rotation center of the sun gear 30 to the cam surface 46 is set to be longest in the center of the cam surface 46 and to be gradually shorter toward the bilateral ends.

On both sides of the cam surface 46, regulating surfaces 48 which have a larger slope than the slope of the respective inclined surfaces 46b, and oppose the side walls of the projections 40 are formed. If the rotation of the outer gear 42 is restrained, the regulating surfaces 48 positioned at both sides of the plungers 36 regulate the angular range where the sun gear 30 (operation knob 12 and planetary carrier 14) can be rotated with respect to the outer gear 42. For example, in a case where the sun gear 30 is rotated in one direction, the sun gear 30 can be rotated with respect to the outer gear 42, in the angular range from a state where the tip portion of the plungers 36 is engaged with the trough portion 46a to a state where the side surface of the projections 40 collide with the regulating surfaces 48. The angular range is equivalent to the play. Furthermore, similarly, there the play also exists even in a case where the sun gear 30 is rotated in the other direction. According to this configuration, even if a large force is applied to the operation knob 12 whose rotation is restrained, the rotation of the operation knob 12 can be reliably restrained without causing any damage to each configuring member. Therefore, it is possible to provide a highly reliable rotation input apparatus 10.

Here, the concave cam portions 44, the plungers 36 and the compression coil springs 38 configure resetting means and are interposed between the outer gear 42 (second rotation body) and the sun gear 30 (first rotation body). When the rotation of the outer gear 42 is not restrained, the plungers 36 are locked into the trough portions 46a of the concave cam portions 44, and the sun gear 30 and the outer gear 42 are temporarily fixed. Accordingly, if the operation knob 12 is rotated, the sun gear 30 and the outer gear 42 are integrally rotated.

In addition, when the rotation of the outer gear 42 is restrained, the operation knob 12 is rotated in the direction where the outer gear 42 is rotated until the rotation thereof is restrained. In this manner, the sun gear 30 is rotated with respect to the outer gear 42 from a predetermined position to the other position, the tips of the plungers 36 are moved so as to ascend the inclined surface 46b from the trough portions 46a of the cam surfaces 46 toward the regulating surfaces 48, and a drag force (touching force against the wall) is generated with respect to the rotation of the operation knob 12. At that time, the planetary gear 28 is rotated and revolves, and the sun gear 30 is rotated at an increased speed with respect to the planetary carrier 14. Then, if the force against the operation knob 12 is removed or the operation knob 12 is rotated in the opposite direction, while the sun gear 30 returns from the other position to a predetermined position with respect to the outer gear 42 and the operation knob 12 is returned to the original position, the planetary gear 28 is rotated and revolves and the sun gear 30 is rotated at the increased speed with respect to the planetary carrier 14. Here, the drag force is generated by the elastic force of the compression coil springs 38, which is compressed when the tips of the plungers 36 are moved from the trough portions 46a of the cam surfaces 46 to the regulating surfaces 48. In contrast, the force returning the operation knob 12 to the original position is generated by the force biased against the inclined surface 46b in such a manner that the compression coil springs 38 in a compressed state are stretched.

As illustrated in FIG. 4, the outer gear 42 is interposed between the planetary carrier 14 and the armature 52. In addition, the outer gear 42 has three engaging projections 50 which are extended upward (in the drawing) from the outer peripheral portion thereof. Claw portions 50a protruding inward in the radial direction are formed on the tips of the respective engaging projections 50, and the claw portions 50a are respectively engaged with notches 18a formed on the upper surface of the disk portion 18 (planetary carrier 14).

In order to ensure the above-described play, the width of the notches 18a in the circumferential direction is formed to be wider than the width of claw portions 50a of the engaging projections 50. Accordingly, the outer gear 42 and the planetary carrier 14 are relatively rotatable within the angular range corresponding to more than twice the play.

A connecting projection 54 protruding from the outer gear 42 toward the armature 52 (friction plate) is inserted to a connecting hole 56 formed on the armature 52, and as illustrated in FIG. 6, the outer gear 42 is in screwed contact with the armature 52 using threads 59. According to this configuration, the outer gear 42 is not moved in the axial direction and is integrally rotated with the armature 52 only in the circumferential direction. Accordingly, if the armature 52 is attracted by a solenoid unit 58, the outer gear 42 is not displaced in the axial direction and the rotation thereof is restrained.

In the electromagnetic brake system 100, if current flows through a coil 64 of the solenoid unit 58, the armature 52 is attracted to the yoke core 60 by the magnetic force generated in the coil 64, and comes into contact with the yoke core 60 (end surface of the outer yoke portion 60d) by contact pressure corresponding to the magnetic force. If the operation knob 12 is rotated in this state, the contact pressure leads to generation of the friction force between the armature 52 and the yoke core 60, that is, the force to restrain the rotation of the outer gear 42.

As illustrated in FIG. 4, the rotation shaft 66 fixed to the shaft hole 30b of the sun gear 30 penetrates through the rotation shaft hole portion 60b of the yoke core 60 and the center hole of the upper case 70 configuring the housing 68, and the tip thereof is present inside the housing 68. By configuring the rotation shaft 66 in this manner, it is possible to appropriately set rotation detecting means (a magnet 76 and a magnetic sensor 78, to be described later) and thereby a degree of freedom for arrangement can be enhanced.

The magnet 76 is fixed to a back yoke 74 fixedly placed on the tip of the rotation shaft 66 by a thread 75. Furthermore, the back yoke 74 and the magnet 76 are accommodated inside the housing 68.

On a wiring substrate 80 attached to the lower case 72, the magnetic sensor 78 (for example, a GMR sensor) is installed so as to oppose the magnet 76. The magnetic sensor 78 outputs a signal corresponding to the rotation of the rotation shaft 66, outward via a connector 82 attached to the wiring substrate 80. Here, the magnet 76 and the magnetic sensor 78 configure the rotation detecting means.

Furthermore, as illustrated in FIG. 2, two fixing projections 84 are provided to protrude outward on the upper case 70. Using the fixing projections 84, the housing 68 is fixed to an instrument panel or a center console.

Figure 7:
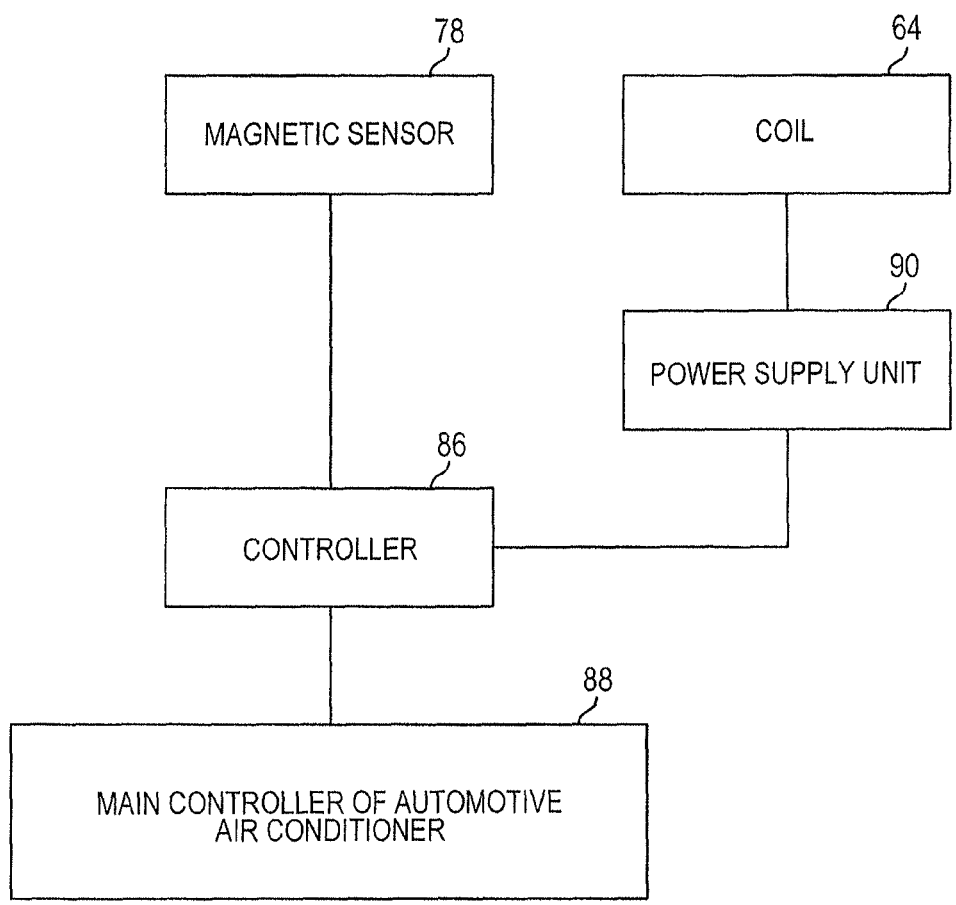
FIG. 7 is a schematic block diagram for describing a circuit configuration of a rotation input apparatus.

FIG. 7 is a schematic block diagram for describing a wiring configuration of the rotation input apparatus 10.

As illustrated in FIG. 7, the rotation input apparatus 10 has a controller 86 as control means for controlling operation of the rotation input apparatus 10. The controller 86 is configured of an MCU (micro computer), for example, and has a CPU (central processing unit), memories or the like.

The controller 86 is connected to the magnetic sensor 78 (rotation detecting means), a main controller 88 of an automotive air conditioner and a power supply unit 90 which transmits current to the coil 64 (braking means), and controls the main controller 88 of the automotive air conditioner based on the output of the magnetic sensor 78.

For example, when the current flows in the coil 64, and the rotation of the outer gear 42 together with the armature 52 is restrained, if the rotation direction of the operation knob 12 is determined to be reversed, based on the output of the magnetic sensor 78, the controller 86 controls in order to stop the current supplied to the coil 64 and terminates the drive of the solenoid unit 58. Furthermore, in a case where the operation knob 12 does not exceed the operation range, the controller 86 does not transmit the current to the coil 64.

According to the configuration of the electromagnetic brake system 100 in the present embodiment, it is not necessary to arrange the bearings or the like inside the yoke core 60. Consequently, it is possible to radially miniaturize the entire electromagnetic brake system 100 and it is possible to realize the reduced manufacturing cost.

In addition, according to the configuration of the force sense imparting type rotation input apparatus 10 using the above-described electromagnetic brake system 100, if the operator rotates the operation knob 12 from a predetermined position to the other position in a state where the rotation of the outer gear 42 is restrained, the drag force (touching force against the wall) is applied to the operation knob 12, the operation knob 12 and the planetary carrier 14 are integrally rotated, the planetary gear 28 is rotated and revolves, and the rotation shaft 66 is rotated in the same direction as the planetary carrier 14, at an increased speed with respect to the planetary carrier 14. Then, if the force against the operation knob 12 is removed or the operation knob 12 is rotated in the opposite direction, while the operation knob 12 returns from the other position to a predetermined position, the operation knob 12 and the planetary carrier 14 are integrally rotated in the opposite direction, the planetary gear 28 is rotated and revolves, and the rotation shaft 66 is rotated in the same direction as planetary carrier 14, at the increased speed with respect to the planetary carrier 14. In this manner, the rotation shaft 66 is rotated at the increased speed with respect to the planetary carrier 14. Therefore, even if an angle is small where the operation knob 12 which is rotated, exceeding the operation range, is rotated in the opposite direction, it is possible to reliably detect changes in the rotation angle and rotation direction of the rotation shaft 66 using the rotation detecting means.

The present invention is not limited to the above-described embodiments, and also includes appropriately modified examples of the above-described embodiments.

For example, in the above-described embodiments, the support portion 70a of the housing 68 is installed inside the yoke core 60 (inner yoke portion 60c). However, the support portion 70a may be installed inside the housing 68.

In one embodiment, the protruded shaft portion 61 has the inclined surface 61a. However, in a case where the concentration of the magnetic flux is unlikely to occur at the adjacent place between the inner yoke portion 60c and the armature 52, depending on the shape of the yoke core 60 or the shape of the armature 52, the inclined surface 61a may not be provided on the protruded shaft portion 61.

In addition, in the above-described embodiment, the GMR sensor is used in order to detect the rotation angle of the rotation shaft 66, but a Hall sensor may be used. Furthermore, optical sensors may be used as the rotation detecting means.

In the above-described embodiment, the regulating surface 48 is provided on the outer gear 42 and the projection 40 is provided on the sun gear 30. However, these arrangement relationships may be reversed.

Figure 8:
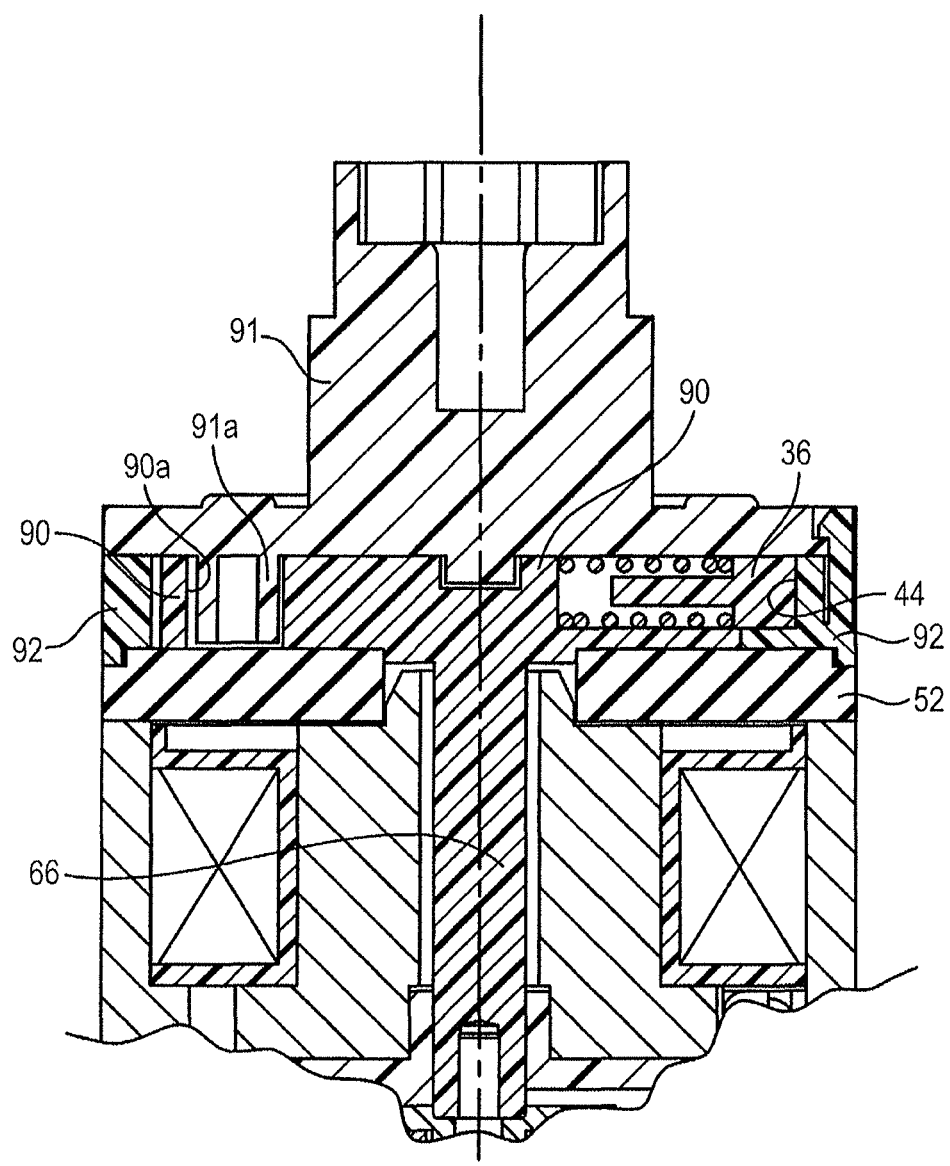
FIG. 8 is a vertical sectional view illustrating a main portion of a modified example of the rotation input apparatus illustrated in FIG. 4.

Furthermore, as the configuration of the electromagnetic brake system 100 in the present embodiment, the configuration (refer to FIG. 4) where the planetary gear mechanism is interposed between the rotation shaft 66 and the outer gear 42 (rotated body) is described. However, a configuration which does not use the planetary gear mechanism, that is, a configuration where the rotated body and the operation knob, which are integrally rotated with the armature, are directly or indirectly connected to each other without the planetary gear being interposed, may be adopted. FIG. 8 is a vertical sectional view illustrating a main portion of a modification example of the rotation input apparatus 10 illustrated in FIG. 4. As illustrated in the modification example, for example, a configuration, where a downward protruding portion 91a which protrudes downward from a connection base portion 91 connected to the operation knob 12 is inserted into a concave shaped portion 90a formed in a rotation shaft holding portion 90 which concentrically holds the rotation shaft 66, may be adopted. Here, an outer rotation base portion 92, as the rotated body, has the cam portion 44, which comes into contact with the plunger 36, and in addition, is connected to the armature 52 so as to be integrally rotated, although this is not illustrated in the drawing. Furthermore, in FIG. 8, members common to the members illustrated in FIG. 4 are omitted except for the main members and the description thereof is omitted.

Finally, the present invention is suitable for the rotation input apparatus for automotive air conditioning systems, but is also suitable for other devices, for example, on-board equipment such as automotive audio systems and automotive navigation systems. In addition, it can of course be applied to personal computers.

It should be understood by those skilled in the art that various modifications, combinations, sub-combinations and alterations may occur depending on design requirements and other factors insofar as they are within the scope of the appended claims or of the equivalents thereof.

What is claimed is:
1. An electromagnetic brake system comprising:
a rotation shaft;

a rotated body, which is attached to the rotation shaft directly or via another member, and is rotated concentrically with the axis of the rotation shaft;

a ring shaped yoke having a first hole portion through which the rotation shaft penetrates;

a concave groove, an inner cylinder portion and an outer cylinder portion, which are formed on the yoke, the concave groove being concentric with the first hole portion and having a ring shape, the inner cylinder portion being formed inward in the radial direction of the concave groove, and the outer cylinder portion being formed outward in the radial direction;

a coil portion accommodated in the concave groove;

a friction plate, which has a second hole portion in the center thereof, through which the rotation shaft penetrates, and which is connected to the rotated body in a state of being arranged between the rotated body and the yoke; and a fixing member, which fixes the yoke, wherein the inner cylinder portion has a protruded shaft portion which protrudes toward the friction plate and is rotatably inserted to the second hole portion, wherein the protruded shaft portion has an outer wall surface, which is concentric with the first hole portion, wherein the fixing member has a support portion, which rotatably supports the rotation shaft, and wherein the support portion has an inner wall surface, which is concentric with the first hole portion in a state of being fixed to the yoke, and the rotation shaft is supported by the inner wall surface.

2. The electromagnetic brake system according to claim 1, wherein a required distance is set for maintaining a state where the end surface of the outer cylinder portion and the friction plate are in contact with each other, and the end surface of the inner cylinder portion and the friction plate are not in contact with each other.

3. The electromagnetic brake system according to claim 1, wherein the protruded shaft portion has an inclined surface, which forms a tapered shape toward the tip.

4. The electromagnetic brake system according to claim 1, wherein a concave portion is formed on a flat area from the root of the protruded shaft portion of the inner cylinder portion through the concave groove.

5. The electromagnetic brake system according to claim 1, wherein the support portion protrudes toward the friction plate from the fixing member, and in the yoke, a third hole portion into, which the support portion is fitted, is formed consecutively with the first hole portion, on the opposite side surface which opposes the friction plate.

6. A force sense imparting type rotation input apparatus, comprising: an electromagnetic brake system comprising:

a rotation shaft;

a rotated body, which is attached to the rotation shaft directly or via another member, and is rotated concentrically with the axis of the rotation shaft;

a ring shaped yoke having a first hole portion through which the rotation shaft penetrates;

a concave groove, an inner cylinder portion and an outer cylinder portion, which are formed on the yoke, the concave groove being concentric with the first hole portion and having a ring shape, the inner cylinder portion being formed inward in the radial direction of the concave groove, and the outer cylinder portion being formed outward in the radial direction;

a coil portion accommodated in the concave groove;

a friction plate, which has a second hole portion in the center thereof, through which the rotation shaft penetrates, and which is connected to the rotated body in a state of being arranged between the rotated body and the yoke; and a fixing member, which fixes the yoke, wherein the inner cylinder portion has a protruded shaft portion which protrudes toward the friction plate and is rotatably inserted to the second hole portion, wherein the protruded shaft portion has an outer wall surface, which is concentric with the first hole portion, wherein the fixing member has a support portion, which rotatably supports the rotation shaft, and wherein the support portion has an inner wall surface, which is concentric with the first hole portion in a state of being fixed to the yoke, and the rotation shaft is supported by the inner wall surface.

* * * * *